US005526269A

United States Patent [19]

Ishibashi et al.

[11] Patent Number: 5,526,269

[45] Date of Patent: Jun. 11, 1996

[54] DIGITAL OPERATION RECORDER

[75] Inventors: Wataru Ishibashi; Akihiro Suzuki, both of Shizouka, Japan

[73] Assignee: Yazaki Corporation, Tokyo, Japan

[21] Appl. No.: 262,376

[22] Filed: Jun. 20, 1994

Related U.S. Application Data

[63] Continuation of Ser. No. 57,418, May 6, 1993, abandoned, which is a continuation of Ser. No. 696,646, May 7, 1991, abandoned.

[30] Foreign Application Priority Data

May 9, 1990 [JP] Japan .................................. 2-117704

[51] Int. Cl.[6] ................................................ G06F 19/00

[52] U.S. Cl. ............................... 364/424.03; 364/424.04; 340/438

[58] Field of Search ......................... 364/424.01, 424.03, 364/424.04, 561; 377/20; 340/438, 439

[56] References Cited

U.S. PATENT DOCUMENTS

| | | | |
|---|---|---|---|
| 4,258,421 | 3/1981 | Juhasz et al. | 364/424.04 |
| 4,638,289 | 1/1987 | Zottnik | 364/424.04 |
| 4,685,061 | 8/1987 | Whitaker | 364/424.04 |
| 4,858,133 | 8/1989 | Takeuchi et al. | 364/424.04 |
| 4,866,616 | 9/1989 | Takeuchi et al. | 364/424.04 |
| 4,992,943 | 2/1991 | McCracken | 364/424.04 |
| 5,046,007 | 9/1991 | McCrey et al. | 364/424.03 |
| 5,253,224 | 10/1993 | Van Doesburg | 364/424.01 |

OTHER PUBLICATIONS

English Abstract of DE 38 39 211 A1 by D. W. Morche, "Journey Data Memory Receiving Signals from Vehicle Tacho –Adding in Counter and Storing in Volatile Buffer Memory and Permanent Memory With Data and Time".

*Primary Examiner*—Gary Chin
*Attorney, Agent, or Firm*—Nikaido, Marmelstein, Murray & Oram

[57] ABSTRACT

A digital operation recorder provided with a recording medium having a data region for recording operation data for each operation of a car, a clock, whose time is correctable, for generating time data, and a write means for successively writing the operation data into the data region within the recording medium at intervals of a preset time and writing, in response to the time data from the clock, such data from which its starting time and ending time can be found out is disclosed. In the recorder, the write means comprises a time write means for writing, every time the operation data of the car is successively written into the data area within the recording medium, the time elapsed after the start of each operation into a first area of the data region such that the currently written elapsed time supersedes the previously written time, and a time-of-day write means for writing, every time the operation data of the car is successively written into the data area within the recording medium, the time of write into a second area of the data region such that the currently written time of write supersedes the previously written time.

2 Claims, 7 Drawing Sheets

DIGITAL OPERATION RECORDER

This application is a continuation of application Ser. No. 08/057,418 filed May 6, 1993, which is a continuation of application Ser. No. 07/696,646, filed May 7, 1991 both now abandoned.

FIELD OF THE INVENTION

The present invention relates to a digital operation data recorder for recording a state of operation of a car in a recording medium in the form of digital data and more particularly relates to a digital operation data recorder adapted to record data from which starting time and ending time of each car operation can be found out, based on time data generated by an incorporated clock.

BACKGROUND OF THE INVENTION

Conventionally, when operation data of a car for each operation is recorded in a memory such as a nonvolatile recording medium within an IC memory card, for example, the recording has been made according to the format as shown in FIG. 6. Referring to FIG. 6, reference numeral 1 denotes a memory in which one word is formed of eight bits (one byte). In the memory 1, there are formed a data region M1 and an ID region M2. The data region M1 is further divided into a distance data recording region M11 partitioned into sections, each section corresponding to each operation, used for successively recording therein the travel distance data compressed by a predetermined compression method, and a speed data recording region M12 also partitioned into sections, each section corresponding to each operation, used for successively recording therein the speed data compressed by the predetermined compression method. The IC memory card is removably mounted into an operation recorder installed on a car. One operation is defined, for example, as the time interval between the mounting of an IC memory card into the operation recorder and the removal of the same from the recorder, whereas the starting time and the ending time of each operation are also recorded on the basis of time data generated by a clock incorporated in the operation recorder.

In the ID region M2, there are recorded such data as the allowance, resolution, and sampling time for each operation, addresses in the regions M11 and M12 at which the final data of the travel distance data and the speed data for each operation are recorded, records as to whether or not the time correction of the clock was made and the number of times of the correction was made, and time correction data. The time correction data is constituted of data related to the time before correction and the time after correction. The time of the clock when a correcting button is operated, which button is provided on the operation recorder to be operated at the start of a time correction, is recorded as the time-before-correction data, whereas the time of the clock when a set button to be operated at the end of a time correction is operated after the time correction is finished by having the clock set forward or backward is recorded as the time-after-correction data.

The IC memory card as the recording medium having the operation data recorded therein as described above is removed from the operation recorder and mounted into an analyzer for analyzing digital operation record. Analyses of each operation are thereby made. As one of the results provided by such analytical processing, the momentarily varying car speed during each operation is arranged in the form of graph to be displayed on the screen of the CRT or printed in a sheet of paper so that the operational state is seen at a glance.

In such a case, based on the collected speed data, and the starting time and ending time, speed varying with time is graphed, having the time taken along the abscissa and the speed taken along the ordinate. When time correction is made in the middle of an operation as described above, the display of the speed is made after executing an additional process using the time correction data then obtained thereby correcting the time axis.

The manner in which the above described correction data is recorded will be described below. When the time of the clock is 20 minutes fast, i.e., 20 minutes faster than the true time, if the correction button indicating the start of a time correction is operated at 1:10, for example, and then the clock is set to 0:50 and the set button indicating the end of the time correction is operated without any time loss in the meantime, "1:10" is recorded as the time data before correction and "0.50" is recorded as the time data after correction. Thus, the starting time of the operation can be corrected to 0:00 according to the time data before correction "1:10" and the time data after correction "0:50".

In reality, it is seldom that the time correction is carried out as described above, but it is carried out in the following manner.

Supposing that the operation of the car was started at the point of time t1, for example, as shown in FIG. 8, "0:20" is recorded as the starting time of operation according to the time data then provided by the clock incorporated in the recorder. If, thereafter, it is noticed that the clock is fast and the correction button indicating the start of a time correction is operated at the point of time t2, then, "1:10" is recorded as the time data before correction according to the time data provided by the clock at that time. Then, ten minutes after the time data is recorded if the clock is set backward a suitable time and the set button indicating the end of the time correction is operated while setting the clock with the radio time signal at 1:00, "1:00" is recorded as the time data after correction according to the time data provided by the clock at that time.

When, as described above, "1:10" was recorded as the time data before correction and "1:00" was recorded as the time data after correction, the analyzer side will take it wrong that the clock was set backward by 10 minutes. Then, if the analyzer side corrects the data of time of the start of operation using such time data for correction, it will conclude that the operation was made for 6 hours and 50 minutes from 0:10 to 7:00, not agreeing with the actual operation time of 7 hours. Once such disagreement is produced, it becomes troublesome to deal with the 10-minute data when displaying or printing the state of operation in the form of a graph, and in some case, such a problem occurs that the data in question becomes missing or overlapped.

SUMMARY OF THE INVENTION

The present invention has been made in view of the above described point of problem.

Accordingly, an object of the present invention is to provide a digital operation recorder which is capable no matter how time correction is made in the course of each operation of recording operation data without causing any trouble in the analytical processing of the operation data.

In order to solve the above described problem, the digital operation recorder according to the present invention, as shown in an basic structural diagram of FIG. 1, comprises a recording medium 3 having a data region $3a_2$ for recording operation data for each operation of a car, a clock 21*c*, whose time is correctable, for generating time data, and a write means 21*d* for successively writing the operation data into the data region $3a_2$ within the recording medium 3 at intervals of a preset time and writing, in response to the time data from the clock 21*c*, such data from which its starting time and ending time can be found out, in which the write means 21*d* includes a time write means $21d_1$ for writing, every time the operation data of the car is successively written into the data area $3a_2$ within the recording medium 3, the time elapsed after the start of each operation into a first area $3a_{23}$ of the data region $3a_2$ such that the currently written elapsed time supersedes the previously written time, and a time-of-day write means $21d_2$ for writing, every time the operation data of the car is successively written into the data area $3a_2$ within the recording medium 3, the time of write into a second area $3a_{22}$ of the data region such that the currently written time of write supersedes the previously written time.

In the described arrangement, it is adapted such that the time write means $21d_1$, every time the operation data is successively written into the data region $3a_2$ within the recording medium 3, writes the elapsed time after the starting time of each operation into the first area $3a_{23}$ of the data region $3a_2$ such that the currently written elapsed time supersedes the previously written time and the time-of-day write means $21d_2$, every time the operation data is successively written into the data region $3a_2$ within the recording medium 3, writes the time of write into the second area $3a_{22}$ of the data region such that the currently written time of write supersedes the previously written time. Accordingly, even if the clock is corrected in the course of each operation, the starting time of the operation can be simply obtained by subtracting the elapsed time recorded in the first area $3a_{23}$ from the time of write recorded in the second area $3a_{22}$. Therefore, when the operation data recorded in the recording medium 3 is later analyzed, the operation data cart be accurately distributed over the period of time between the start and the end of the operation. Therefore, such a difficulty is not caused at all that the data does not accurately correspond to the time.

DESCRIPTION OF PREFERRED EMBODIMENT

An embodiment of the present invention will be described below with reference to the accompanying drawings.

Figure 1:
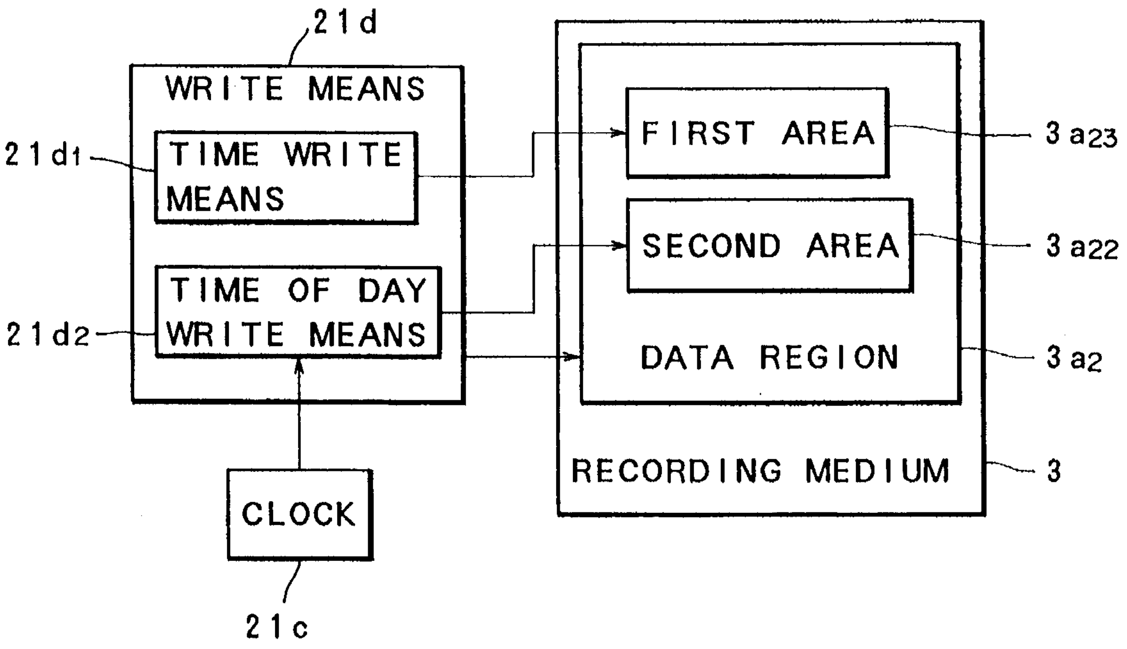
FIG. 1 is a block diagram showing a basic structure of a digital operation recorder according to the present invention.
Figure 2:
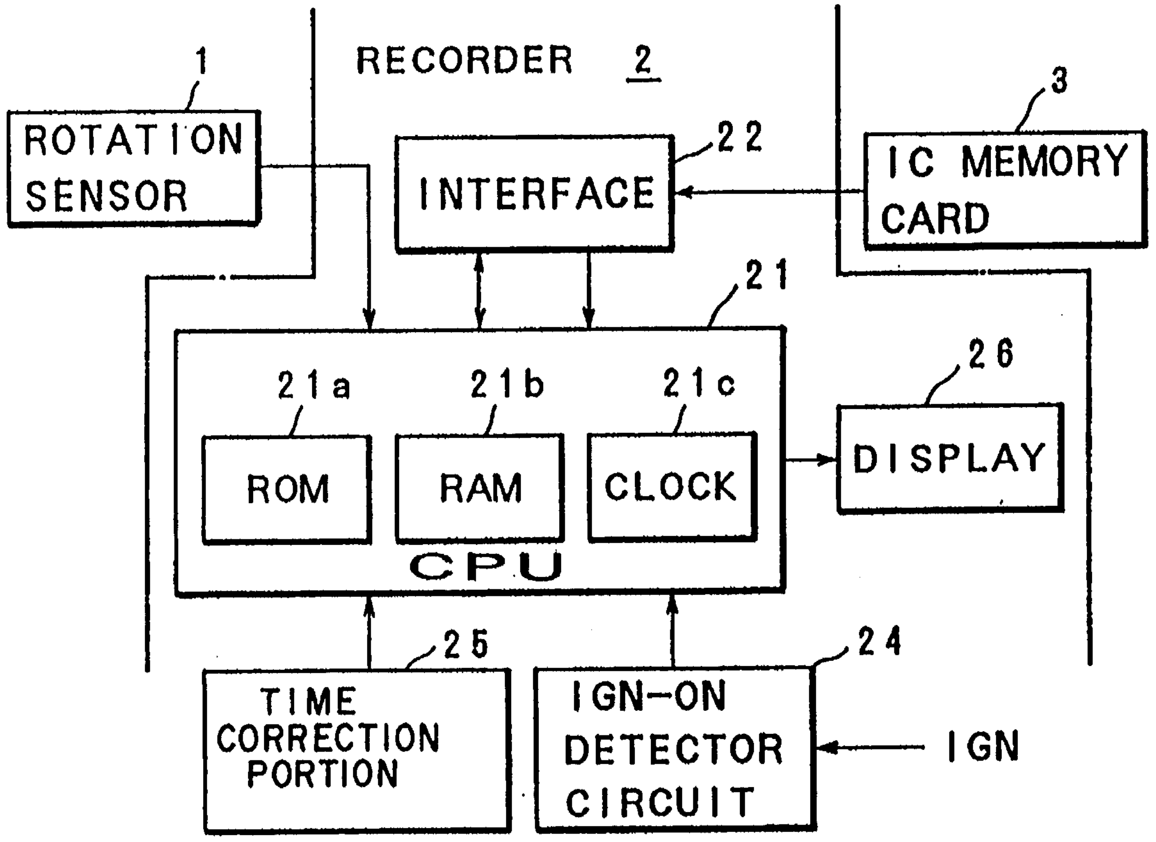
FIG. 2 is a block diagram showing an embodiment of the digital operation recorder according to the present invention.

FIG. 2 is a diagram showing an embodiment of a digital operation recorder according to the present invention. Referring to FIG. 2, reference numeral 1 denotes a rotation sensor for sensing the rotation of an axle through the mission of a car thereby converting the number of revolutions into an electric signal. Reference numeral 2 denotes the recorder for sampling the signal from the rotation sensor 1 to accept it as the input signal thereto and obtaining speed data and travel distance data by calculation with the input signal, and then performing compression processing of such data and recording the compressed data. The recorder 2 has a microcomputer (CPU) 21 including a ROM 21*a* storing a control program and others, a RAM 21*b* partly used for recording various data and partly used as a work area, a clock 21*c* for generating real time data, consisting of year, month, day, hour, minute, and second, etc., an IGN-on detector circuit 24 for detecting the on-state of the ignition (IGN) of the car, a time correction portion 25 for performing time correction of the clock 21*c* within the CPU 21, and a display 26 for performing a time display on the basis of the time data generated by the clock 21*c*, in which the time correction portion 25 has, for example, a correction-start button, a correction button, a set button, etc. The CPU 21 is adapted such that an IC memory card 3 as the recording medium is mounted thereon through an input/output interface 22 formed of connectors and the like and it directly monitors the IC memory card 3 whether or not it is in a recordable state. Upon mounting of the IC memory card 3 on the CPU 21, it becomes ready for recording the operation data.

Figure 3:
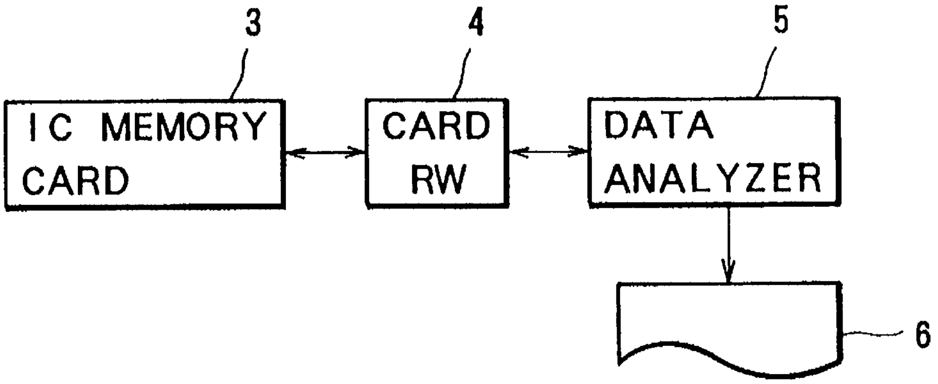
FIG. 3 is a block diagram showing an example of a data analyzer for analyzing the operation data recorded by the recorder of FIG. 2.

FIG. 3 is an apparatus for data analysis, in which reference numeral 4 denotes a card RW reading the contents recorded in the IC memory card 3 taken out of the recorder 2, and clearing the data recorded in the IC memory card 3 upon completion of the reading thereby making the card ready for reuse, and 5 denotes a data analyzer saving the speed record data transferred from the card RW 4 into a floppy disk or the like, analyzing the compressed data, reproducing the state of operation, and printing results of calculation and graphs on output paper 6. The IC memory card 3 whose contents cleared by the card RW 4 is initialized by the same card RW 4 and, at this time, data of set values such as the above described allowance to be used for speed data compression and the like are recorded therein.

As the car with the above described recorder 2 mounted thereon starts its operation, the rotation sensor 1 generates a pulse signal and supplies the signal to the CPU 21. The CPU 21, on the basis of the input pulse, measures the instantaneous speed with the preset resolution at intervals of a sampling time preset in accordance with the above mentioned data of set values, allows the measured speed data to pass through a compression process on the basis of the allowance preset in accordance with the data of set values, and writes the results of the compression into the IC memory card 3 as the recording medium. The data of set values is previously stored in the RAM 21*b*. The CPU 21 is operated by a control program so as to function also as a controller for exercising general control on all the functions of the apparatus.

Figure 4A:
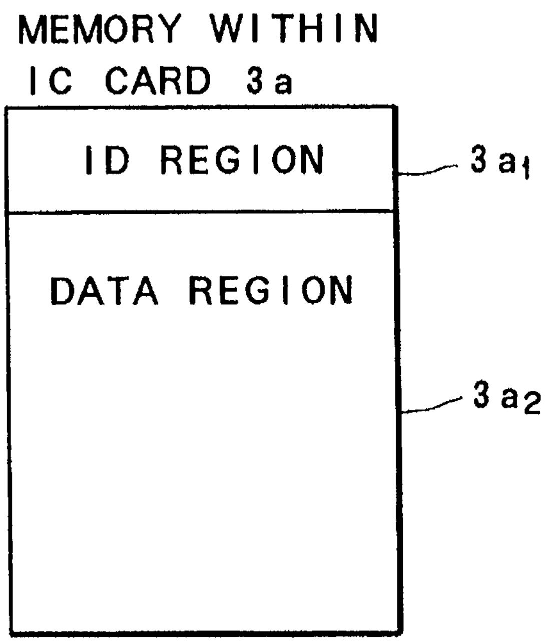
FIGS. 4A–4C are diagrams showing an example of structure of data recorded in an IC memory card in the recorder of FIG. 2.
Figure 4B:
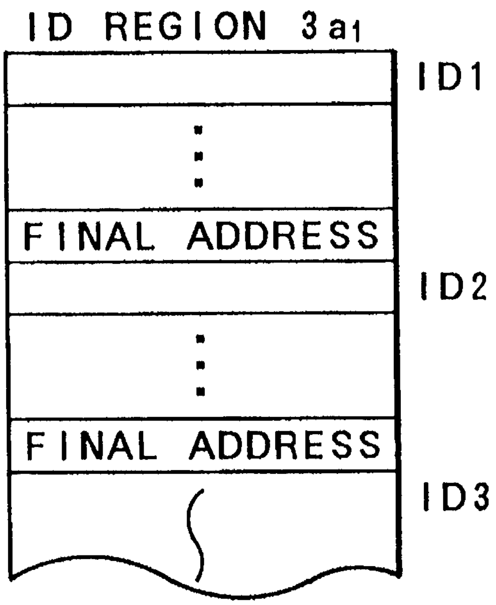
Figure 4C:
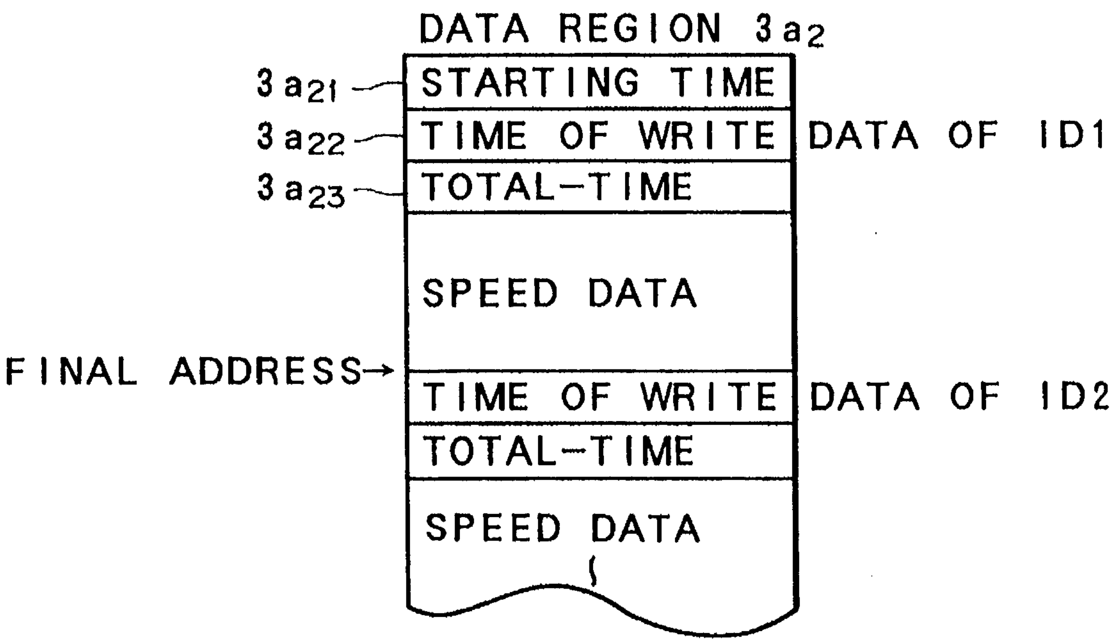
Figure 6:
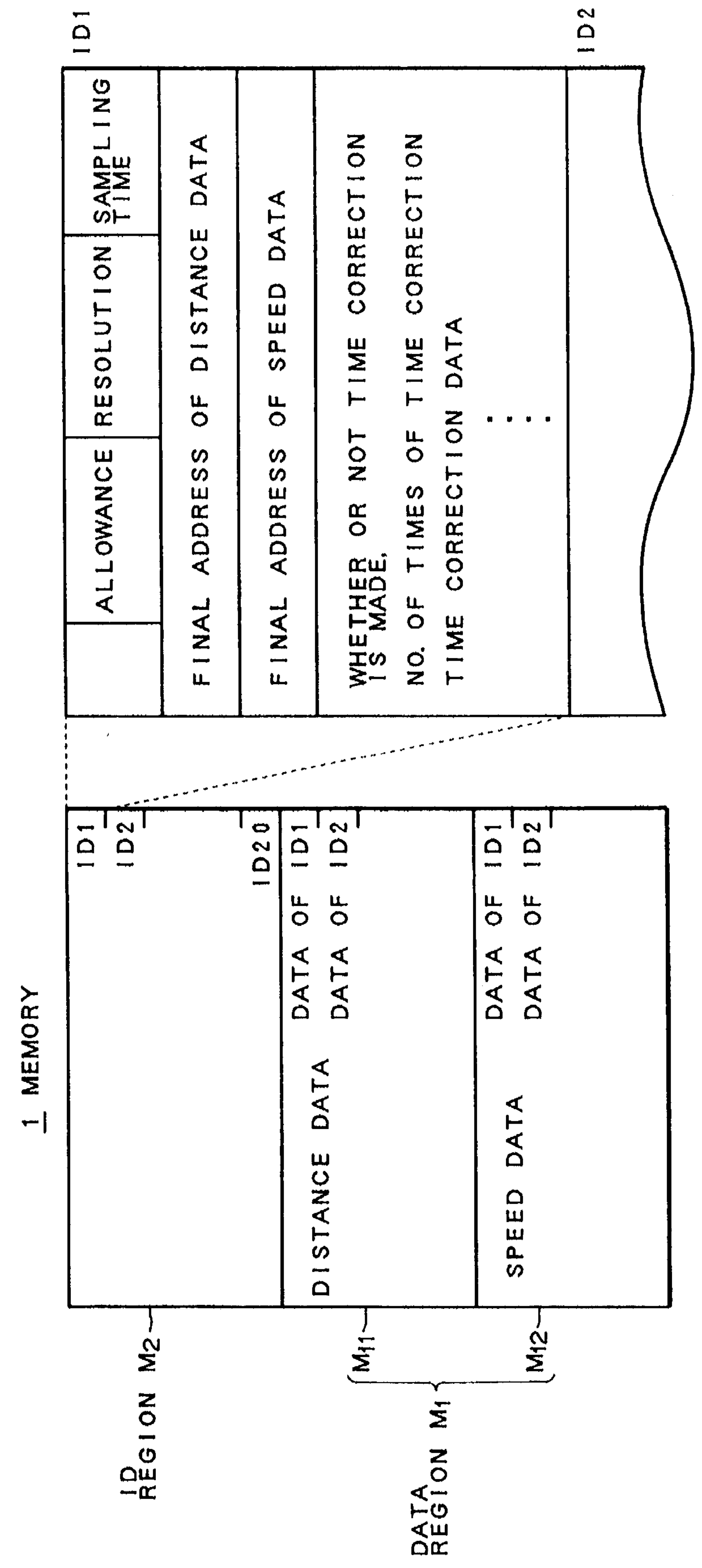
FIG. 6 is a diagram of data recorded in an IC memory card by a conventional recorder.
Figure 7:
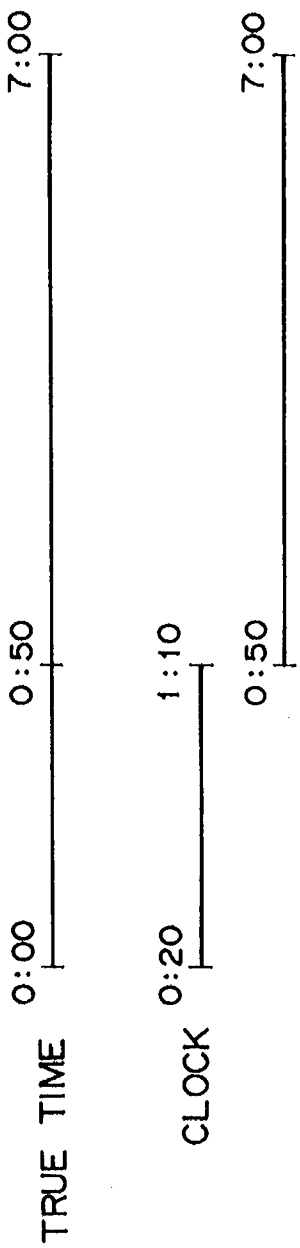
FIG. 7 is a diagram for explaining a method for correcting the time of a clock.
Figure 8:
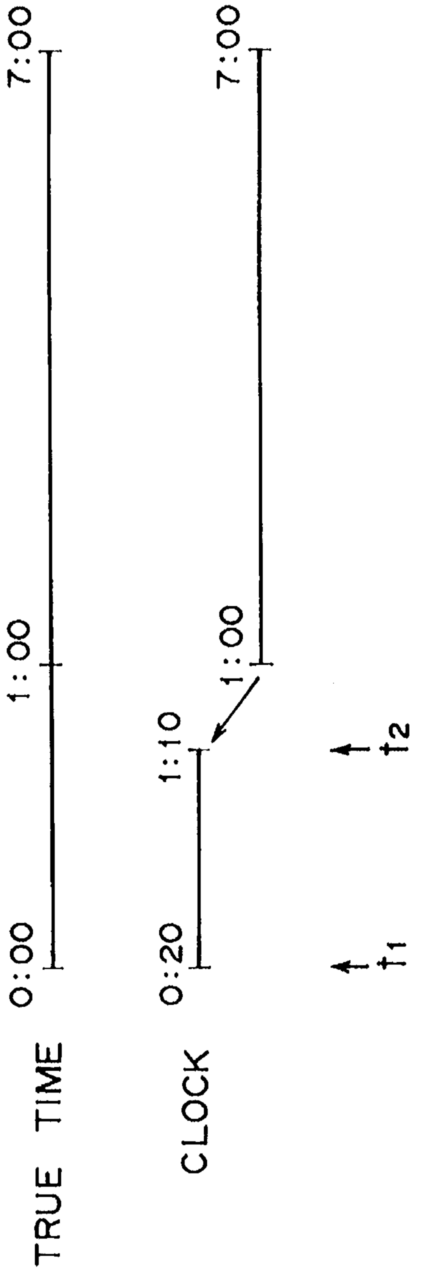
FIG. 8 is a diagram for explaining a problem involved in the recording method of FIG. 6.

A memory 3*a* formed, for example, of a nonvolatile memory within the IC memory card 3, consist, as shown in FIG. 4(*a*), of an ID region $3a_1$ for recording ID and a data region $3a_2$ for recording data. In the ID region $3a_1$, there are recorded, as shown in FIG. 4(*b*), such data, the same as those mentioned with reference to FIG. 6, as the allowance, resolution, and sampling time for each operation, addresses in each region at which the final data of the travel distance data and the speed data for each operation are recorded, and, in addition, records as to whether or not time correction of the clock was made and number of times of the correction made and time correction data. The time correction data is constituted of data related to time before correction and time after correction, and the time data before correction and the time data after correction are recorded when the operating buttons at the time correction portion 25 are operated.

Meanwhile, in the data region $3a_2$, there are formed, as shown in FIG. 4(*c*), an area $3a_{21}$ in which the starting time, i.e., the time when the first ID is recorded in the memory 3a within the IC memory card 3, is recorded, an area $3a_{22}$ in which a time of write is written every time the speed data is recorded in each operation, so as to overwrite the previously written time of write, and an area $3a_{23}$ in which the total-time between the aforesaid starting time and the point of the aforesaid recording is written, so as to overwrite the previously written total-time.

When a time correction is carried out, the time-after-correction is recorded as the above time of write, but the starting time remains unchanged. Since the overwriting is performed every time the data is written as described above, when ID is renewed, the previous time of write remains fixed, and accordingly, such time of write becomes the ending time of the ID before the renewal. The starting time can be easily calculated by "time of write - total-time". The writing anew the final data address every time the data is written is for the purpose to make clear the address at which next data is written. Further, the writing of the starting time at the beginning of the data region is for making it possible to analyze data referenced from the starting time even if by any chance the card should be removed from the recorder without the time of write written in or in the event of a similar accident.

Figure 5:
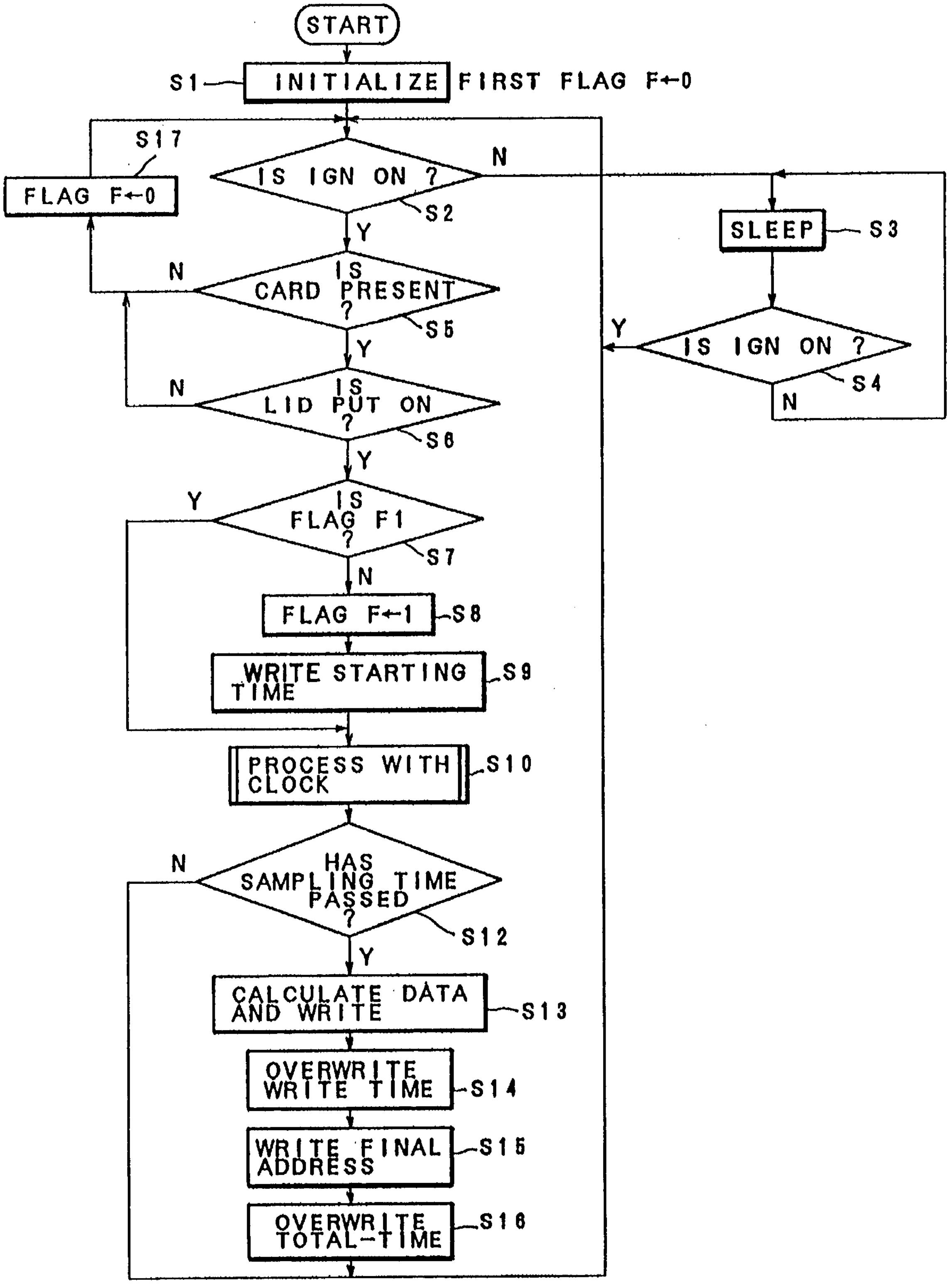
FIG. 5 is a flow chart showing steps of work executed by a CPU within the recorder of FIG. 2 in accordance with a prescribed program.

While the functions of the recorder 2 have been outlined in the foregoing, detailed operations thereof will be described below with reference to the flow chart of FIG. 5 showing the steps of work executed by the CPU 21 in accordance with a predetermined control program.

As the power supply is turned on, the CPU 21 starts its operation, and in the first step S1, it makes initialization and sets an initial flag to "0". In the next step S2, it monitors the signal from the IGN-on detector circuit 24 and decides whether or not the IGN switch is turned on. When the decision is NO, it advances to step S3 where it creates a sleep state. In the next step S4, it again determines whether or not the IGN switch is turned on, and if the decision is NO, it executes the steps S3 and S4 over and over again. When the decision is YES, it, returning to the step S2 and passing therethrough, advances to step S5. In the step S5, it determines whether or not the IC memory card 3 is mounted in the input/output interface 22, and if the decision is YES, it advances to step S6. In the step S6, it determines whether or not the card mounting portion is covered by its lid so that the card is in its state ready for recording and, if the decision is YES, it advances to step S7.

In the step S7, it determines whether or not the initial flag is "1" and, if the decision is NO, it advances to step S8. In the step S8, it sets the initial flag to 1, and then advancing to step S9, it records the starting time in the specified area $3a_{21}$ of the data region within the IC memory card 3 using six bytes for year, month, day, hour, minute, and second and, at the same time, writes "000 . . . 00" as the total-time into the specified area $3a_{23}$ of the data region, and then advancing to step S10, it executes a process with the clock. In this process with the clock, such jobs are performed as writing data for the above described time correction in accordance with the time correction operation.

The CPU 21 then advances to step S12, where it determines whether or not the sampling time has passed, and if the decision is NO, it returns to the step If the decision in the step S12 is YES, it advances to step S13, where it executes a process, for example, of speed calculation with the sampled data and writes the results as speed data into the data region $3a_2$. Thereafter, it advances to step S14, where it overwrites the time of write in the specified area $3a_{22}$ of the data region $3a_2$. Then, advancing to step S15, it writes the final addresses into the specified area of the data region $3a_2$. Thereafter, it advances to step S16, where it changes the total-time data, which it wrote into the area $3a_{23}$ in the above step S9, by giving it an increment and returns to the step S2.

If the decision in the step S5 or S6 is NO, the CPU 21 determines that one operation has finished and moves to step S17, where it sets the flag F to "0".

As understood from the foregoing description, the, CPU recorder 2 1 functions as a write means 21d for writing operation data into the data region $3a_2$ within the IC memory card 3 at intervals of a predetermined time through execution of step S13, step S14, and step S15, and also writing the data from which its starting time and the ending time can be found out on the basis of the time data from the clock 21c. Especially it functions, through execution of the step S14, as the time write means $21d_1$ for writing, every time the operation data of the car is successively written into the data region $3a_2$ within the IC memory card 3, the elapsed time after the start of each operation, i.e., the total-time, into the area $3a_{23}$ of the data region $3a_2$ such that the currently written total-time supersedes the, previously written time, and also functions, through execution of the step S15, as the time-of-day write means $21d_2$ for writing, every time the operation data of the car is successively written into the data region $3a_2$ within the IC memory card 3, the time of write into the area $3a_{22}$ of the data region such that the currently written time of write supersedes the previously written time.

Since, as described above, it is adapted such that, every time the data is written in the data region $3a_2$, the time of write is overwritten and the total-time which is the elapsed time after the starting time is also overwritten, the starting time of each operation can be simply obtained by subtracting the total-time from the time of write, without depending on the time correction data. Therefore, various types of trouble occurring when the starting time of each operation is obtained depending on the time correction data can be eliminated.

According to the present invention as described so far, no matter how the clock correction was made in the course of each operation, the starting time of the operation can be simply obtained and, hence, When the operation data recorded in the recording medium is later analyzed, the operation data can be accurately distributed over the period of time between the star and the end of the operation. Therefore, such a difficulty will never be caused that the data does not accurately correspond to the time and an effect can be obtained that no trouble is produced in the analysis of the operation data.

What is claimed is:

1. A digital operation recorder for providing a correct start time for each operation of a vehicle comprising:

a recording medium having a data region for recording a plurality of operation data of each operation of said vehicle;

a presettable clock for generating time data, said presettable clock having means for correcting said time data to a correct time during the operation of said vehicle; and write means for storing each of said plurality of operation data into said data region at predetermined time intervals during operation of said vehicle, wherein said write means includes elapsed time write means for storing, into a first data area of said data region, an elapsed time from when each operation of the vehicle is started, said elapsed time is updated each time one of said plurality of operation data is stored into said data region at said predetermined time intervals, time-of-day writing means for storing, into a second data area of said data region, a time-of-day at which one of said plurality of operation data is stored into said data region, said time-of-day is determined based upon said time data from said presettable clock and is stored into said second data area each time one of said plurality of operation data is stored into said data region at said predetermined time intervals, and means for determining said correct start time of each operation of said vehicle based upon said elapsed time and said time-of-day corresponding to one of said plurality of operation data when said time data is corrected by said presettable clock during the operation of said vehicle.

2. A digital operation recorder according to claim 1 further comprising an ignition-on detector means, connected to said write means, for detecting an on-state of an ignition of the vehicle.

* * * * *